United States Patent
Nimocks, III

(10) Patent No.: US 6,205,701 B1
(45) Date of Patent: Mar. 27, 2001

(54) TERMITE INTERCEPTION AND BAITING SYSTEM AND METHOD OF USE THEREOF

(76) Inventor: David R. Nimocks, III, 2709 Breezewood Ave., Fayetteville, NC (US) 28303

( * ) Notice: Subject to any disclaimer, the term of this patent is extended or adjusted under 35 U.S.C. 154(b) by 0 days.

(21) Appl. No.: 09/369,876

(22) Filed: Aug. 9, 1999

Related U.S. Application Data

(62) Division of application No. 08/788,260, filed on Jan. 24, 1997, now Pat. No. 5,950,356.
(60) Provisional application No. 60/010,555, filed on Jan. 25, 1996.

(51) Int. Cl.[7] .................................................. A01M 1/20
(52) U.S. Cl. ........................................... 43/131; 43/132.1
(58) Field of Search ................................. 43/131, 132.1, 43/133, 107, 124

(56) References Cited

U.S. PATENT DOCUMENTS

| 5,042,194 | * | 8/1991 | Cohen | 43/131 |
| 5,099,598 | * | 3/1992 | Carter | 43/132.1 |
| 5,329,726 | * | 7/1994 | Thorne et al. | 43/124 |
| 5,899,018 | * | 5/1999 | Gordon et al. | 43/131 |
| 5,937,571 | * | 8/1999 | Megargle et al. | 43/131 |

* cited by examiner

Primary Examiner—Peter M. Poon
Assistant Examiner—Judith A. Nelson
(74) Attorney, Agent, or Firm—Peter J. Georges

(57) ABSTRACT

An apparatus and method for monitoring and controlling termite infestation. The apparatus is comprised of a termite resistant housing having (1) a bottom, (2) sidewalls having an interior and exterior surface and (3) a top. The top includes an opening for accessing the interior of the housing to identify the presence of termites and to introduce toxic bait into the housing when the presence of termites is observed through the opening for accessing the housing interior. The housing has at least one sidewall opening large enough to permit termites to pass through and nontoxic termite bait fixedly attached to the interior and/or exterior of one or more of the housing sidewalls. A number of alternative architectures are provided which have in common the feature of allowing termites to transition from nontoxic bait to toxic bait that is introduced in a manner that minimizes disturbance to the termite habitat at, without or within the apparatus. The nontoxic bait, which is affixed to the housing sidewalls, may be on the interior or exterior of the walls and the interior of the housing. The housing interior may be subdivided to allow bait replenishment sequentially in separate compartments within the housing and without disturbance of exhausted toxic bait compartments. The apparatus architecture, where the nontoxic bait is situated on the exterior of the housing walls and the interior of the housing is compartmentalized, provides maximum protection against termite disturbance at the monitoring, detecting and control stages.

10 Claims, 7 Drawing Sheets

TERMITE INTERCEPTION AND BAITING SYSTEM AND METHOD OF USE THEREOF

This application is related to the provisional application Ser. No. 60/010,555, filed Jan. 25, 1996 and is a divisional of Ser. No. 08/788,260, filed Jan. 24, 1997, now U.S. Pat. No. 5,950,356.

BACKGROUND OF THE INVENTION

1. Field of Invention

This patent application relates to termite control, specifically to a method and system for termite interception and baiting designed to suppress or eradicate colonies of termites, thereby protecting objects such as structures, agricultural crops and trees against termite attack.

2. The Prior Art

For many years, the indiscriminate application of environmentally persistent pesticides at ground level in and around the foundation of structures at points of possible termite entry and attack, in order to form a barrier to termite entry, has been the only viable method for effective, long term protection of structures and other items against termite attack. However, concerns over the effect of such tactics on the short and long-term health of persons occupying treated structures and on the general environment surrounding the structures has forced a reassessment of termite control tactics by the termite control industry. This reassessment has included efforts to develop viable, low impact alternatives to indiscriminate "wholesale" applications of pesticides currently used to prevent or control termite attack.

One potential replacement method for barrier treatments for termite control is termite baiting. Termite baiting is the aggregation of termites at a fixed point and their elimination due to their consumption of a toxicant-containing bait placed at the point of aggregation. This method of protection has several advantages over current methods. It involves the use of only a fraction of the amount of pesticide active ingredient that would have been expended to accomplish protection of an object, such as a structure, using barrier methods. The pesticide bait can optionally be placed in a secured, tamperproof station that prevents movement of bait out of the station into the general environment, yet permits termite entry into the station. Placement of bait in a station also minimizes the potential for exposure of humans, especially children, and large animals to the bait. Perhaps most importantly, termite baiting results in the elimination or suppression of the termite colony, not just the exclusion of members of the colony from the point of attack or object being protected. Because a termite bait must be consumed by termites in order to be effective, a technique must be developed to consistently and repeatedly make the bait available for consumption by members of a termite colony at a fixed point over a long enough period of time for the bait to have the intended toxic effect on the colony. However, to accomplish this, a baiting system must deal with several issues that left unresolved, make a baiting method and/or system unlikely to succeed.

Because termites consume cellulose for nutrition, termites are a serious threat throughout much of the world to structures or other objects containing wood or other cellulose containing components. Termites can be divided into two basic classifications, subterranean and non-subterranean. Subterranean termite colonies live primarily in the ground and forage for cellulose containing food items in the earth or above ground by building a system of closed mud tunnels to traverse from the ground to the above ground food source. Non-subterranean termite colonies live above ground near or within the food source they are consuming.

For several reasons, it is desirable that termite bait be applied only after contact has been established with a termite colony and termites are aggregated for the purpose of feeding on the bait at a fixed, arbitrary baiting point. These reasons include minimization of the amount of bait manufactured, potential deterioration of bait if it is left in place for long periods of time in anticipation of prospective termite attack, minimization of the potential for unintended exposure of children and pets to the bait, etc. Therefore, any responsible baiting method and/or system must anticipate the need to first aggregate termites at a point with a nontoxic aggregating medium and only then apply toxic bait at that point.

As currently developed, bait stations are devised to achieve detection and suppression of termites by utilizing a system comprised of a housing with openings and a set of interchangeable bait cartridges. In the device described in U.S. Pat. No. 5,329,726, granted Jul. 19, 1994, the architecture of the cartridges is such that they have a plurality of openings that correspond to the openings in the housing when placed within the housing.

The problem of termite disturbance is addressed in U.S. Pat. No. 5,329,726 by providing that the cartridges used for identification and suppression of termites each have openings that align with the housing openings when the cartridges are inserted within the housing. After detection of termites in nontoxic bait cartridge used during the detection stage, that cartridge is removed and replaced with a toxic bait cartridge of corresponding architecture. In accordance with the teaching of patentee in U.S. Pat. No. 5,329,726, the substitution of the pesticide containing cartridge for the nontoxic cartridge will not disturb pre-existing galleries or passageways established by termites to provide access between the termite colony and the openings in the outer housing of the control station because the outer housing remains fixed relative to the terrain and the openings in the pesticide cartridge remain in alignment with the openings in the housing. Accordingly, termites are provided with continued access to the pesticide-containing bait cartridge within the housing, thus permitting continuous feeding and the transport of pesticide-containing food to the termite colony through the pre-established connections between the colony and the bait stations.

3. The Present Invention

In accordance with the present invention, a system has been devised which allows termite detection and baiting in a manner where the transition of feeding termites from nontoxic to toxic bait is effected with minimal, if any, disturbance of the nontoxic bait feeding site.

Instead of removing the nontoxic bait that aggregated the termites at the baiting point and replacing it with toxic bait as taught in U.S. Pat. No. 5,329,726, the present invention leaves the nontoxic bait in place and supplements it with toxic bait placed adjacent to the nontoxic bait that is infested with foraging termites. Although, U.S. Pat. No. 5,329,726 teaches that disturbance of termites is minimized by the use of an interchangeable system of cartridges, such a system of cartridges does not minimize the disturbance of foraging termites to the same extent as the present invention. This is because a system of interchangeable cartridges, while not disturbing termite tunnels up to the point they enter the outer housing, does disrupt and sever, during cartridge substitution, the termite tunnels that have been constructed by termites between the inner wall of the outer housing and the maximum point to which they have penetrated the cartridge of nontoxic bait; it being possible that termites disturbed even to this extent by the changing of cartridges can abandon a baiting site on account of such disturbance, thereby negating any opportunity to eradicate the colony. Additionally, according to the teaching of U.S. Pat. No. 5,329,726, termites are forced to involuntarily transfer from infesting and consuming nontoxic bait to consuming toxic bait whereas according to the present invention, termites can voluntarily transfer from consuming the nontoxic bait to consuming the toxic bait. The present invention, because it never disturbs or removes nontoxic bait or toxic bait infested with termites, avoids the disturbances inherent in the use of a system of interchangeable cartridges.

This is achieved by utilizing an architecture of housing and interceptor (the nontoxic bait element) wherein the interceptor is fixedly attached within or without housing in a manner which allows the introduction of toxic bait into the housing while minimizing disturbance of the interceptor that termites are feeding on. By minimizing disturbance of the feeding termites the likelihood of termites abandoning the site is greatly reduced.

A key feature of the present invention resides in introduction of bait in a manner which does not disturb the nontoxic bait sites and access to and from same.

Reference to the architecture of housing and interceptor developed in accordance with the present invention utilizes interceptor placement outside and/or inside the housing into which the toxic bait is introduced. Indeed, in one of the embodiments of the invention, the interceptor forms a gateway to the housing interior. In the embodiment where the housing is sealed to eliminate access by other termite competitors and/or predators, access to the interior volume of the housing is achieved by consuming the portion of the interceptor which covers the housing opening/openings fabricated as termite access ports.

Referring, by way of example, to the system devised in which the nontoxic bait used during the termite detection stage is fixed within or without a perforated housing and entirely covers the openings in the perforated housing, it is notable that both the housing and the nontoxic bait remain fixed relative to the terrain in which they are placed and the entrance through the housing as well as the nontoxic bait remain undisturbed in the course of introduction of toxic bait after the presence of termites is detected.

In describing the present invention herein, the nontoxic bait which is affixed to the sidewalls is referred to as an interceptor. The presence of termites is identified when consumption of the nontoxic bait interceptor or exploratory tunnels formed by termites is observed by looking into the housing. Importantly, in accordance with the present invention, after detection of termites, the integrity of the passageway or tunnel constructed by termites through the housing wall and in, on, through and/or around the nontoxic bait interceptor is not disturbed.

Further, in accordance with the present invention, the toxic bait is introduced into the interior of the housing and as the termites consume the toxic bait, it is replenished—again without disturbing the integrity of the passageways through the previously placed bait or disturbing any part of the interceptor that has not been consumed. Moreover, in accordance with a specific embodiment of the present invention, by compartmentalizing the housing interior to form a plurality of compartments which termites can access once they have entered the housing interior, such as by utilizing dividing walls with openings through which termites can pass from one compartment to another, toxic bait can be introduced sequentially in each compartment. Thus, as the toxic bait introduced into one compartment is consumed, toxic bait can be introduced into another compartment thereby even avoiding the de minibus disturbance of the nontoxic bait interceptor and the toxic bait residue being replenished.

Yet further in accordance with the present invention, provision is also made for excluding nontarget insects from the baiting site delimited by the housing. The presence of such nontarget organisms such as ants, which are natural enemies of termites, is avoided by allowing access to the interior of the housing only through openings leading thereto formed by the termites themselves.

The architecture of the baiting system of the present invention provides a bait station system and method for termite detection and control that minimizes disturbance to pheromone trails laid down through, around and within the bait housing at all stages of use, namely, identification, introduction of toxic bait and supplementation of toxic bait as the toxic bait is consumed.

The present invention allows termites to be successfully transitioned from consuming the nontoxic substance that aggregated them to consuming the toxic bait that will suppress or eliminate them while minimizing disturbance of the feeding termites. Moreover, in accordance with the present invention, if a placement of toxic bait is consumed before colony suppression or elimination is completed, termites are transitioned from consuming one batch of toxic bait to consuming another batch of toxic bait while minimizing disturbance of the feeding termites. Therefore, the method and system disclosed herein operate on the underlying principle that as part of the baiting process, termites must be successfully transitioned from consuming a nontoxic aggregating medium to consuming a toxic bait or transitioned from consuming one batch of toxic bait to consuming another batch of toxic bait without disturbance or at least in a manner minimizing disturbance.

SUMMARY OF THE INVENTION

The present invention in its broadest aspect relates to an apparatus and method of using the apparatus for monitoring, detecting and controlling termite infestation. The device has a housing composed of a termite resistant material, comprised of (1) a bottom, (2) sidewalls having an interior and exterior surface and (3) a top. The top, bottom and the interior surface of the sidewalls delimit a housing interior volume. The top includes means for accessing the housing interior volume to identify the presence of termites and to introduce toxic bait into the interior volume when the presence of termites is observed. Identification of the presence of termites may be achieved by means for removing and securing the top. Means for accessing the housing interior volume may be located in the top whereby inspection does not require removal of the top. The housing has at least one opening in a sidewall. The opening or openings in one or more of the housing sidewalls is of a size large enough to permit termites to pass through the sidewall opening. The apparatus also includes at least one termite interceptor comprised of a nontoxic termite bait composition that is fixedly attached to at least one sidewall and covers at least a portion of such sidewall.

In one embodiment of the invention, the sidewall to which the interceptor is fixedly attached has no opening in it. The interceptor in this case is accessed through an opening in an adjacent or opposing sidewall.

In another embodiment of the invention, the sidewall to which an interceptor is fixedly attached has at least one opening, but the interceptor covers no part of the opening.

In another embodiment of the invention, the sidewall to which the interceptor is fixedly attached has an opening and the interceptor is fixedly attached to the exterior surface of the sidewall in which the opening is located. The interceptor overlies at least a portion of the sidewall opening.

In yet another embodiment of the invention, the sidewall to which the interceptor is fixedly attached, has an opening and the interceptor is fixedly attached to the interior surface of said sidewall. The interceptor overlies at least a portion of the sidewall opening.

In another embodiment of the invention, the interior of every sidewall opening is overlaid by an interceptor in its entirety.

In another embodiment of the invention, the exterior of every sidewall opening is overlaid by an interceptor in its entirety.

In accordance with the present invention, the housing interior volume may be divided into a plurality of compartments by one or more interior walls. The compartments may be accessible through sidewalls. The compartments may also be accessible by termites present in an adjacent compartment through an opening in the interior wall which adjacent compartments have in common. The interior walls are preferably termite resistant.

The housing interior volume in the above-described alternative embodiment of the invention, which is divided into a plurality of compartments by one or more interior walls, is preferably accessible by termites present in an adjacent compartment through an opening in the interior wall which adjacent compartments have in common. One or more interior walls may be termite resistant.

The present invention relates in its one aspect to an apparatus for monitoring, detecting and controlling termite infestation. The apparatus is comprised of a termite resistant housing. The housing has a bottom, sidewalls and a top which form an interior volume adapted to contain toxic bait which is added after termites are found. The top includes means for accessing the housing interior volume to identify the presence of termites and to introduce toxic bait into the interior volume upon identification of the presence of termites. The housing has at least one sidewall opening which may be of any shape. The opening(s) in the sidewall(s) is/are of a size large enough to permit termites to pass through the opening(s).

A termite interceptor made of a nontoxic termite bait composition is fixedly attached to a sidewall.

Preferably, each sidewall has at least one sidewall opening it. The number of sidewalls depends on the shape selected, which may be cylindrical as well as polygonal.

The sidewall openings on each of the sidewalls may be slits equidistant from and parallel to the sidewall bottoms. The slits are preferably about 2 to about 4 millimeters in width. A plurality of slits may be used on each sidewall. The distance between the slits preferably from about 4 to about 8 millimeters.

Most preferably, the interior surface of each sidewall having a sidewall opening is covered by an interceptor that is fixed thereon and is not moved or removed during the introduction of toxic bait.

Alternatively, the interior of each sidewall may be covered by affixing an interceptor thereon that is a unitary piece, the exterior walls of which interfit within and abut against the interior walls of the housing.

Alternatively, the exterior surface of each sidewall having a sidewall opening may be covered by affixing an interceptor thereon that is not moved or removed during introduction of the toxic bait.

Alternatively, the exterior of each sidewall may be covered by affixing an interceptor thereon that is a unitary piece, the interior walls of which interfit within and abut against the exterior walls of the housing.

The housing interior volume may be divided into a plurality of compartments. Interior walls may be used for this purpose. Each compartment is preferably accessible by termites present in an adjacent compartment through a common wall. Access is provided by one or more opening(s) in the interior common wall which adjacent compartments have in common. The openings are sized to enable termites to pass through. The walls are preferably termite resistant.

The housing interior volume may be secured against the entry of non-termite organisms. This is accomplished be sealing entry to the interior volume such that, in order for a termite to gain entry to the interior volume, it must consume at least a portion of said nontoxic termite bait overlying said sidewall and sidewall openings in that sidewall in order to form an opening in said termite interceptor large enough to permit a termite to pass through the interceptor and through the sidewall opening covered by the interceptor.

Another aspect of the invention relates to a method of monitoring, detecting and controlling termite infestation, which comprises:

a) positioning, in an area to be monitored for termite presence, an apparatus for monitoring and detecting termite infestation, comprising a housing composed of a termite resistant material, comprised of (1) a bottom, (2) sidewalls having an interior and exterior surface and (3) a top, said top, bottom and the interior surface of said sidewalls delimiting a housing interior volume, said top including means for accessing the housing interior volume to identify the presence of termites and to introduce toxic bait into the interior volume upon identification of the presence of termites; said housing having at least one sidewall opening in said housing sidewalls of a size large enough to permit termites to pass through said sidewall opening; and a termite interceptor comprised of a nontoxic termite bait composition fixedly attached to at least one sidewall and covering at least a portion of said sidewall;

b) inspecting the interior volume of said apparatus until termite activity is identified; and then c) inserting toxic bait into the interior volume while maintaining in place the interceptor.

In another aspect, the present invention relates to a method of monitoring, detecting and controlling termite infestation, comprising:

a) positioning, in an area to be monitored for termite presence, an apparatus for monitoring and detecting termite infestation, comprising a housing composed of a termite resistant material, comprised of (1) a bottom, (2) sidewalls and (3) a top, said top, bottom and sidewalls delimiting a housing interior volume, said top including means for accessing the housing interior volume to identify the presence of termites and to introduce toxic bait into the interior volume upon identification of the presence of termites; said housing having at least one sidewall opening in said housing sidewalls of a size large enough to permit termites to pass through said sidewall opening; and a termite interceptor comprised of a nontoxic termite bait composition overlying said sidewall opening whereby, in order for a termite to enter the housing interior volume through said sidewall opening, it must consume at least a portion of said nontoxic termite bait overlying said sidewall opening to form an opening in said termite interceptor large enough to permit a termite to pass.

b) inspecting the interior volume of said apparatus until termite activity is identified; and then c) inserting toxic bait into said interior volume while maintaining in place the interceptor through which the termites observed in step b) are accessing the internal volume.

The method of the present invention also includes the step of inspecting the interior volume after inserting toxic bait therein to identify when the toxic bait inserted into the interior volume needs replenishment. When replenishment is required, additional bait is inserted into the interior volume.

The toxic bait that is added preferably is of a type that is preferentially consumed by termites over the nontoxic bait which is used to make the interceptors.

In the embodiment of the invention where the interior volume of the housing with interceptors in place and affixed to the sidewalls is compartmentalized by means of internal walls and each compartment is accessible by termites present in an adjacent compartment through an opening in the wall that such adjacent compartments have in common, the method of the present invention alternatively includes the sequence of replenishing toxic bait as follows:

introducing toxic bait in a first compartment;

identifying when said toxic bait in said first compartment has been consumed and replenishment of toxic bait is required; and then, replenishing the bait by introducing toxic bait in a second compartment adjacent to said first compartment. The toxic bait used is preferably of a type that is preferentially consumed by termites over the nontoxic bait that is used in the interceptors.

Figure 1:
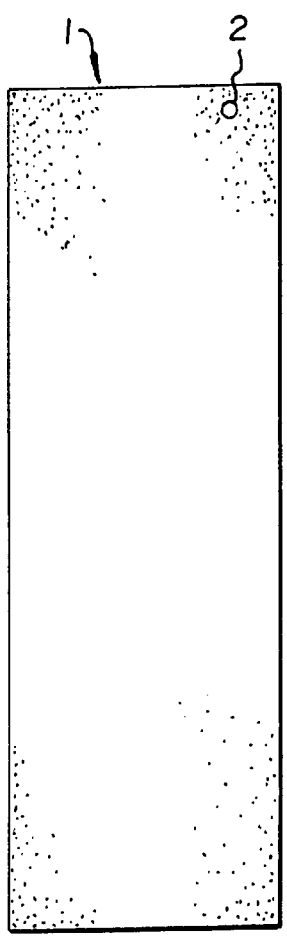
FIG. 1 is a frontal view of an interceptor for use with the main embodiment and the first, fourth, fifth and sixth alternative embodiments of the invention.

DETAILED DESCRIPTION OF THE INVENTION AND ALTERNATIVE MODES OF CARRYING OUT THE INVENTION

The same reference numerals may appear on more than one figure as certain components are common to more than one embodiment of the invention. The elements of the invention illustrated in the drawing are as follows:

1) Interceptor
2) Attachment hole for attaching interceptor to station.
3) Fastener for attaching interceptor to station.
4) Cover attachment hole for attaching cover to station with tie.
5) Interceptor attachment hole for fastener used to attach interceptor to station.
6) Access and baiting opening
7) Termite entry opening
8) Solid column area of wall
9) Station side wall
10) Solid area at bottom of wall
11) Station
12) Protective covering
13) Termite entry opening in protective covering
14) Cover
15) Tie for securing cover to station
16) Attachment hole in cover
17) Large termite entry opening The aggregation of foraging termites that randomly discover aggregating medium placed for that purpose, herein referred to as interception, and their suppression or eradication through baiting, take place within a tamper proof system as disclosed below. The system, in conjunction with a termite bait, is employed in areas of known or suspected termite activity according to the method disclosed below.

Seven embodiments of the system are described herein. They consist of seven different configurations of protective station, nontoxic aggregating medium, referred to as interceptors, and toxicant containing bait.

The main embodiment of the present invention is characterized by the placement of the interceptors on the interior of the station and the interception of termites within the station. All numerals refer to FIG. 2 except when a figure number is provided in front of the reference numeral. The system consists of a protective housing, referred to as station 11 with one or more termite access openings 7 formed in its surface to facilitate access to the interior of the station by randomly foraging termites. The station should be large enough to simultaneously contain an adequate amount of both bait and interceptor in the preferred configuration. The station is a rigid, hollow housing with four sides, a bottom and a baiting and access opening 6 opposite the bottom. The termite access openings can be of any size or shape, however they must be large enough to permit unencumbered entry by termites into the station. Preferably, a plurality of openings are formed throughout the surface of the station. The station is constructed of an inert substance such as extruded plastic of a thickness adequate to impart sufficient rigidity to the walls 9 to withstand warping under the lateral pressure that will be imposed on the walls if the station is buried in the earth. The station can be made, for example, of an extruded plastic approximately ⅛" thick with the termite entry openings formed either at the time of extrusion or cut into the station after extrusion using methods obvious to those skilled in the art. The station can be formed as two or more pieces that snap together. The baiting and access opening 6 is large enough to permit inspection of the station interior and to insert and remove aggregating medium and bait. Provisions are made to attach the interceptors FIG. 1-1 and the cover FIG. 6-14 to the station. For instance, the interceptors can be fixedly secured to the interior of the station by forming openings at the top of each of the four side walls of the station 5 through which a screw-type fastener 3 can be passed that is also passed through a hole FIG. 1-2 drilled at the top of the interceptor. Two openings 4 used to secure the cover to the station are formed at the top of two opposite side walls of the station. When the center of the cover is placed directly over the center of the opening in the top of the station, these two openings 4 in the station walls match in location and distance apart two similarly sized openings FIG. 6-16 in the cover. A nylon locking tie FIG. 6-15 passed continuously through the two openings in the station and the two matching openings in the cover secures the cover to the station. Alternately, instead of numerous small termite entry openings, two larger openings on each of the four sides FIG. 7-17 can be formed, each opening approximately 1 and ½ inches×3 inches.

For example, the station 11 can be 2 inches square×8 inches long. The termite entry openings in the housing are a plurality of slits 7 running across the short 2 inch width of each of the four walls; such slits being perpendicular to the length of the housing, approximately 2–4 millimeter wide with the distance between each slit being approximately 4–8 millimeters. These slits can be formed in such a way that each slit runs continuously around the station, on all four sides, except for areas (columns) left intact at the four corners 8 wherever two sides meet along the length of the station to maintain the integrity, strength and shape of the station. An area with no slits is also left at the top and bottom of each side of the station 10 in order to further increase the strength and rigidity of the station.

Figure 2:
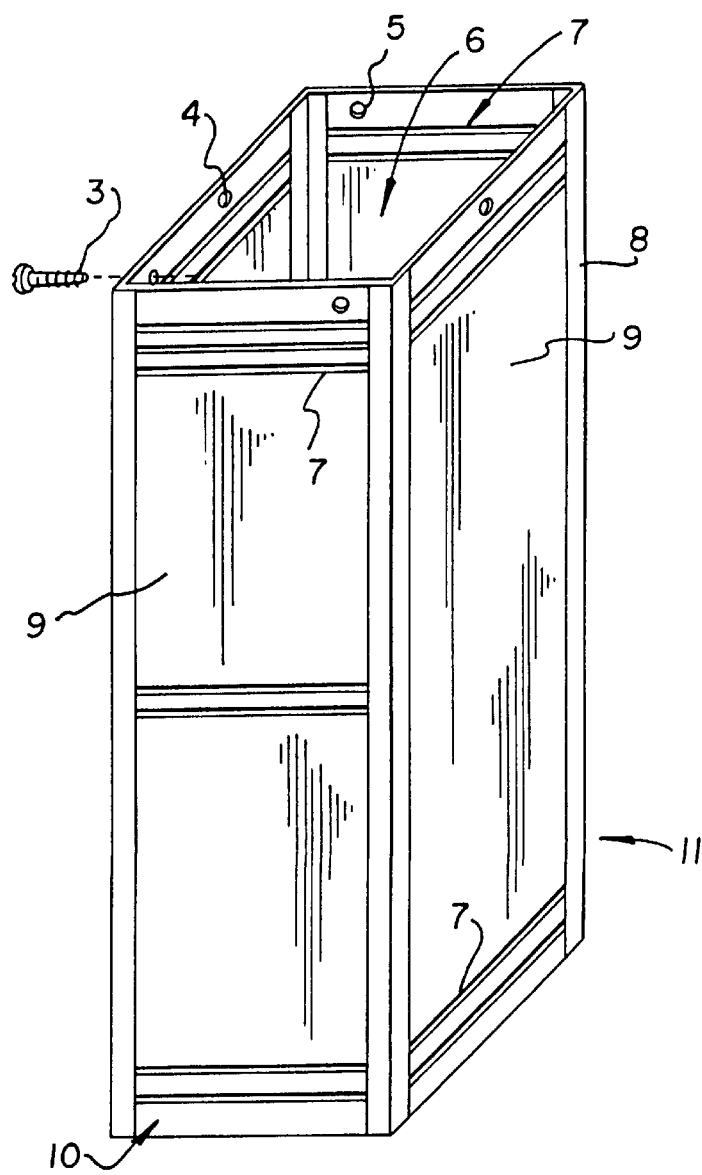
FIG. 2 is a perspective view of the station used with the main embodiment and the first, fourth, fifth and sixth alternative embodiments of the invention.
Figure 3:
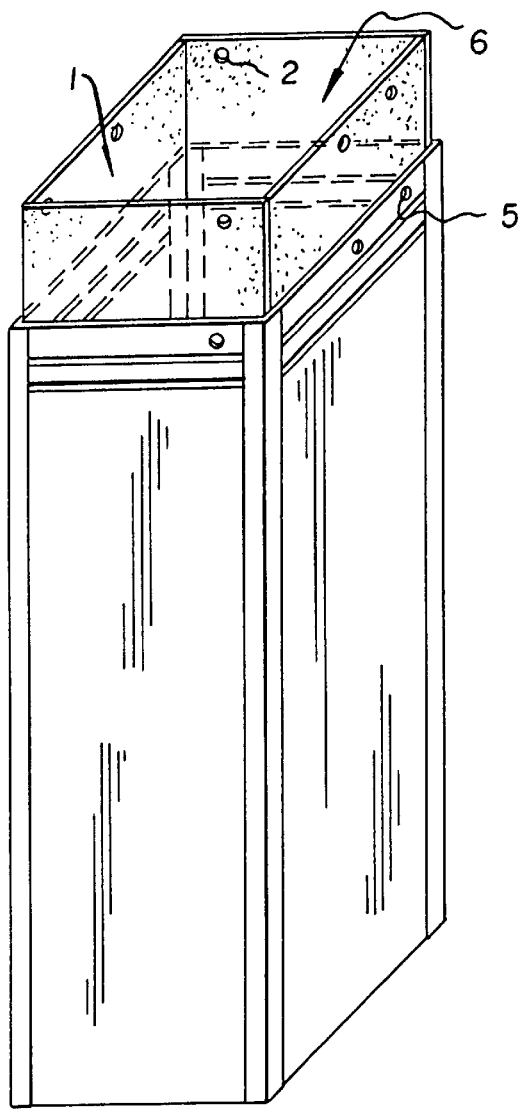
FIG. 3 is a perspective view of interceptors being inserted into the station according to the main embodiment of the invention.

One or more interceptors FIG. 1-1 made of a cellulose containing material palatable to termites are provided. Preferably, a plurality of interceptors are placed in the station, each against an interior station side wall, such that each interior wall and thereby the entire interior surface of the station, except the access opening and the bottom, is covered by interceptors FIG. 3 (figure shows interceptors partially inserted into station). Preferably, there is left after placement of the interceptor(s) in the station a hollow cavity in the center of the station that is surrounded by interceptors affixed to the walls. Bait is placed in this cavity after termites are discovered foraging on the interceptors. Preferably, the interceptors are of a minimal mass; only that necessary to serve the function of intercepting randomly foraging termites. Because the minimal mass of interceptor(s) is quickly consumed by termites, they quickly transition from consuming the interceptor(s) to consuming the toxic bait once the bait is put in place. The interceptor(s) is fixedly attached to the interior of the station in such a way that an interceptor is against, adjacent to, contiguous to, abuts or adjoins the interior of the station and is also against, adjacent to, abuts or covers at least a portion of one termite access opening in the station walls. The interceptor(s) is fixedly attached to the station in order to insure that it will not be moved or removed at any point in the interception and baiting process.

For example, interceptors can be pieces of a cellulose containing substance, palatable to termites, sized such that one interceptor has approximately the same dimensions as one side wall 9 of the station. When four interceptors of this size are secured to the four side walls of the station, one to each wall, a thin layer of wood lines the interior of the station. Interceptors are made from a cellulose containing substance many species of termites are known to preferentially consume, preferably Southern Yellow Pine wood. Four Pine interceptors (one for each wall) approximately 2 inches wide×8 inches long×⅛ inch thick would fit within the prescribed station. Holes are formed at the top edge of each interceptor FIG. 1-2 that match in location and orientation the location of holes 5 at the top of the sides of the station. These holes are used to fixedly secure the interceptor to the station as explained above.

Alternately, the interceptors can be held in place with an overhanging lip formed at the top and bottom of the inside of each side wall of the station (not shown) when the station is extruded, such that each interceptor can be snapped into place against the wall by placing one end of the interceptor behind the lip at the bottom inside edge of the station and then, while slightly bowing the interceptor, inserting the opposite edge behind the lip at the top of the same wall.

Alternatively, four interceptors, each with approximately the same dimensions as the interior of one side wall of the station, can be joined along their long side edges in order to form a hollow square box, open at both ends, that is approximately the length of the station interior (not shown). These interceptors can then be installed within the station interior as a single unit that lines the interior of the station. This unit can then be secured to the station at a single point. Such an arrangement simplifies the installation and securing of the interceptors to the station.

Alternately, a single interceptor can be used. For instance, a block of wood, the external dimensions of which approximate the interior dimensions of a station, can be bored out from top to bottom leaving a minimal amount of mass in the walls of the block (not shown). When this hollowed out block is slipped into the station, the block fits snugly within the interior of the station.

Provided with the system is a cover FIG. 6-14 fitted to cover the access and baiting opening 6 and shield the interceptor(s) and bait from the exterior environment. The cover is made of an inert substance such as extruded plastic of a type and thickness similar to the walls of station. The cover can be removed for the purpose of inspecting the station interior and its contents and for adding bait. The cover can be secured to the station in a tamper proof fashion as explained above to reduce the possibility of the escape of any bait placed in the station out of the station and to minimize disturbance of termites feeding in the station. Alternately, the cover can contain a small inspection port (not shown) that is fitted with a removable plug that is removed when an inspection of the interceptor(s) is made to detect termite activity. Such a plug allows the station to be inspected for termite attack without the necessity of removing the cover.

For example, a flat cover FIG. 6-14, 6"×6"×⅛" made of the same material and of the same thickness as the station is provided. The cover is sized such that, when it is installed flush against the open top of the station, perpendicular to the length of the station, it overhangs each side of the housing. Such an overhang helps reduce the amount of moisture draining into the station when the station is place in the earth. For instance, an overhang of two inches on each side is sufficient.

Optionally, in order to exclude nontarget organisms from the station interior, the interceptor is sized and the holes in the station wall are positioned such that when one side of an interceptor abuts an interior wall of the station, the interceptor covers all termite entry openings in that wall. The interceptor must be sized and the termite entry holes positioned such that, when the interceptor abuts an interior wall of the station, the portion of the station wall perimeter that adjoins the perimeter of the interceptor does not have any termite entry holes formed in it; in effect forming a continuous surface around the entire perimeter of the wall 8, 10 against which a substance to impeded organism movement, placed between the station wall and the interceptor, can rest. Such an arrangement is most easily accomplished by forming all the termite entry holes in the station wall such that when the interceptor is in place, all of the termite entry holes in the station wall lay well within an area of the station wall the boundary of which is defined by the perimeter or edges of the interceptor. A barrier to the entry of nontarget organisms, such as a semi solid, harden in place sealant material (not shown), such as silicone caulk or a flexible gasket type material, is placed along the periphery of the side of the interceptor on the part of the interceptor that lays against 8 and 10. The interceptor is then placed abutting an interior wall of the station. The sealant material forms a barrier to nontarget organisms entering a termite access hole in the station and attempting to travel in possible small gaps or discontinuities in the interface between the interceptor and the station wall. Such organisms, while they may be successful in finding a termite entry opening, will be blocked from actually entering the station interior by the sealant material because it forms a continuous, unbroken barrier to such entry. However, because they eat cellulose, termites can gain unimpeded entry to the station by forming an opening through the cellulose containing interceptor. The limited number of openings into the station formed by termites through the interceptors can be secured and defended by the termite colony against entry by their natural enemies into the station much more effectively than if the colony was forced to defend against the entry of natural enemies through the multitude of openings that would be present around the edge of the interceptor if the gasket material was not in place or if the interceptor was not sized large enough to cover all of the openings in the station body walls.

For example, the station can be secured against the entry of nontarget organisms with the use of 80 inches of foam gasket material ¼ inch wide. This gasket is placed around the perimeter of one side of each of the four interceptors such that when the interceptor is in place, the gasket will rest on the portion of the interior of the side walls of the station into which no slits have been formed 8, 10.

Figure 12:
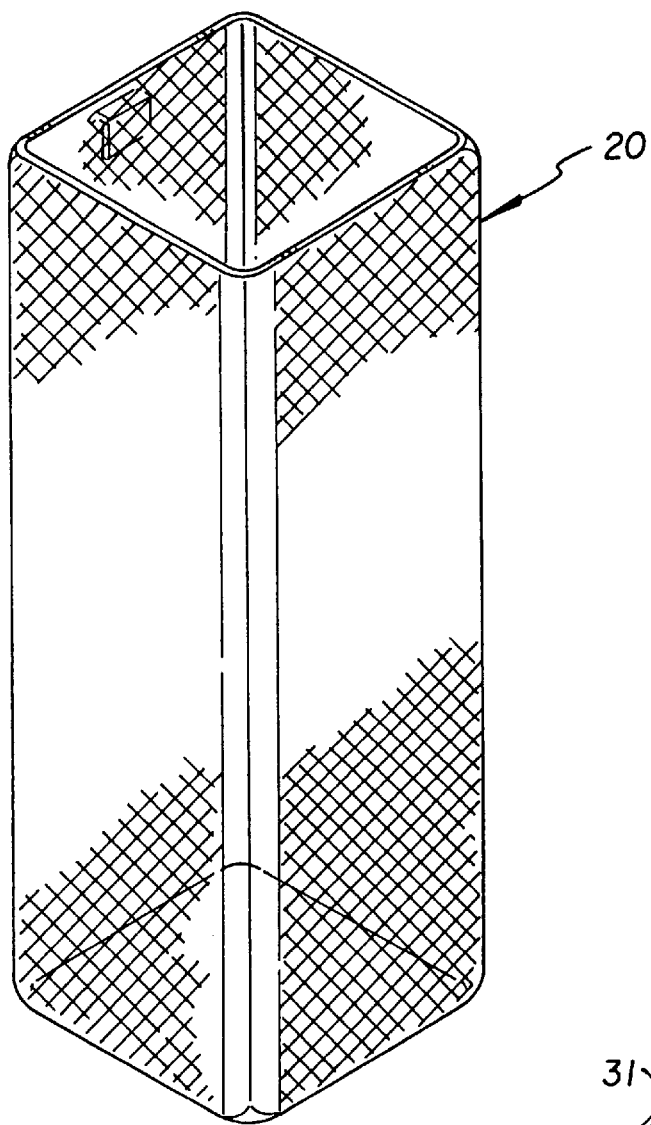
FIG. 12 is a perspective drawing of a mesh bag which acts as a bait container.

Optionally, loose fill baits such as sawdust can be placed in a bait container, such as a mesh bag shown in FIG. 12, before being placed in the station. The bag is sized such that, when it is filled with bait, it completely or substantially fills the part of the station interior not occupied by interceptors, preferably a cavity in the center of the station. Upon insertion, the sides of the bag are against, adjacent to, contiguous to, abut or adjoin the interceptor(s). Preferably, the bag fits snugly into a hollow cavity in the station interior where once in place, it is surrounded by interceptors under attack from termites. Termites gain access to the bait through the mesh openings in the bag. The openings are sized to permit termite entry while reducing, to the extent possible, the escape of bait out of the bag. When the bait bag is inserted into the station, care must be taken to not move or disturb interceptors in the station. When large openings are formed in the station walls FIG. 7-17, any bait placed in station is preferably contained in a bait container.

For example, a bait bag made of a synthetic fabric with mesh openings in the bag large enough to allow unimpeded entry of termites into the bag yet exclude the movement of bait particles out of the bag is provided for this purpose. The mesh openings can be, for example, approximately ⅛" in diameter.

Figure 13:
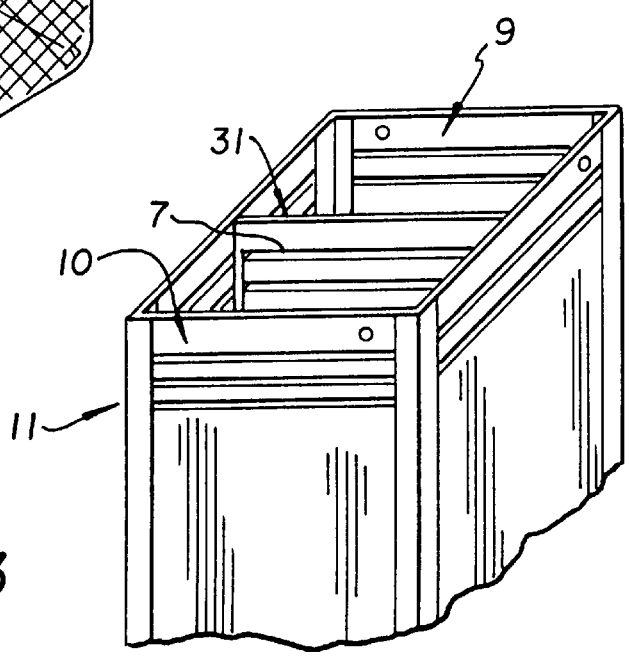
FIG. 13 is a partial perspective view illustrating the embodiment of the invention where the interior of the station is divided.

Optionally, the interiors of all three types of system stations can be subdivided into multiple, separate bait compartments as shown in FIG. 13. The compartments can be formed by adding wall(s) 31 within the interior of the station. Depending upon their number and configuration, walls can be used to divide the station interior into two (as shown in FIG. 13) or more separate compartments.

Referring to FIG. 13, the interior of station 11 can optionally be divided in half by placing a third wall having the same architecture as wall 9 with termite access openings 7 in the interior of the station in a plane parallel to and equidistant from opposing exterior walls 9. The compartments formed may be 2, 3, 4 or even more and the internal configuration can be formed by selecting appropriate interior wall configurations.

The walls used to divide the station interior may be of the same material and thickness as the exterior walls with at least one termite entry opening formed in the walls. Preferably openings are formed in interior walls to the same extent as they are formed in the exterior walls of the station. The use of more than one chamber in the station permits the placement of initial and successive additional bait placements in separate chambers. This results in an absolute minimization of the disturbance of termites feeding on bait in one compartment during the addition of supplemental bait in another compartment. Ideally the initial bait placement is made in a compartment at one end, side or corner of the station. Successive bait placements, optionally in bait containers such as a mesh bag, are made in adjoining compartments. Termites feeding in one chamber move to the adjacent newly baited compartment as the supply of bait in the previously baited compartment is exhausted by their continued feeding.

Also provided is a bait palatable to and preferentially eaten by the species of termite to be suppressed or eradicated containing a toxicant known to be effective in suppressing or eradicating that species of termite. The bait consists of a substrate that termites will preferentially consume to which the toxicant is applied. The bait can come in many physical forms. For example, the bait substrate can be loose fill, gelatinous, solid block or thin solid strips, etc. The substrate is preferably of a density such that it is even more favorably consumed by termites than the interceptors. Given a choice of two substances identical except for their density, termites often prefer the less dense (less mass for a given volume) version of the substance because less effort is needed to consume it. Bait substrates with a lower density than Southern Yellow Pine include wood flour, paper towel, cardboard. Although these substrates are essentially the same substance as Southern Yellow Pine (cellulose), the fact that they are a less dense form of the substance means they are often more favorably consumed by termites.

Objects that can be protected from termite attack according to the present invention can include structures, trees, agricultural crops or any other object in need of protection from termite attack or eradication of an ongoing attack against it. To suppress or eradicate subterranean termites, stations are fitted with interceptor(s) and optionally fitted with provisions to exclude nontarget organisms according to the system. The cover is affixed to the top of the station as provided.

To suppress or eradicate subterranean termites, system stations are buried in the ground around or under a structure or other object to be protected in areas known, suspected or likely to be inhabited by subterranean termites foraging for food. An opening is made in the ground the approximate size and depth of the station. The station is placed in the ground with the top edge of the station flush with the earth's surface. Earth is filled in and compacted against the sides of the station such that earth rests firmly against the termite entry openings in the sides of the station. A plurality of stations can be used for any given area to insure that each colony in the subject area is intercepted. For example, to protect a structure, stations can be placed in the ground every 5 to 50 feet around the perimeter of the structure with stations preferably placed every 10 to 25 feet.

To suppress or eradicate non-subterranean termites and subterranean termites feeding above ground, the stations can be attached directly to cellulose containing members of a structure or item being attacked. To control subterranean and non-subterranean termites in a structure, stations are attached to an above ground cellulose part of the structure known or suspected to be inhabited by termites. The station is attached directly to and with all or part of one or more sides of the station flush against a cellulose containing part of the structure or object that termites are suspected or known to be attacking making sure that one or more termite entry openings are flush against and touches the cellulose containing item.

Stations are inspected for termite attack on a regular, periodic basis (every 30 to 120 days). Termites locate the station and the interceptor(s) it contains as the result of their foraging in search of food sources in the immediate station area. An inspection is performed by removing the cover and visually inspecting the surface of the interceptors facing the vacant center cavity of the station interior for termite attack. Because of the nature of termite attack against a thin piece of wood such as the interceptor, visible signs or evidence of such attack will invariably be left on the surface of the interceptor and in the station. This evidence can include, for example, exploratory tunnels built by termites as they consume the interceptor that disfigure the interceptor in such a way that telltale signs of termite infestation are left on the surface of the wood. Such signs of infestation would be obvious to anyone skilled in the art of termite damage detection. If termite attack is discovered, the station is baited. If no termite attack is discovered, the cover is replaced and the station is inspected again after the appropriate interval. Once termites have been discovered attacking the interceptor(s), the station is baited with a toxicant containing bait. An amount of bait, whatever its form, is inserted into the cavity in the center of the station such that it substantially fills the cavity. Bait can optionally be placed in the bait container, such as a mesh bait bag sized to fill the cavity once it is inserted in the station.

Bait is placed in the heretofore vacant station interior after termites are found to be attacking the interceptor(s), however at no time is the interceptor(s) moved or removed. Bait is placed in the station against, adjacent to, contiguous to, abutting or adjoining at least one interceptor after termites are found to be attacking the interceptor(s), however at no time are any interceptors moved or removed. The cover is replaced and the station is inspected again after the appropriate interval.

Termites consuming an interceptor inevitably discover and transition to feeding upon the nearby newly introduced bait. This can be for one or more reasons. If the bait is of a lower density and of a consistency even more favorably consumed by termites than the interceptors, then termites may cease to consume the interceptor and transition to consuming the bait before the entire interceptor is consumed. If termites continue to consume the interceptors even after the station is baited, termites will be forced to eventually transition to consuming the bait. This is because the mass of the interceptors is purposefully minimized, insuring that termites will quickly consume the interceptors in their entirety, thereby necessitating that the colony again search for a food source. Because the bait is nearby and is of a nature preferably consumed by termites, they invariably begin consuming the bait.

If the placement of additional toxic bait at a later date becomes necessary due to the depletion of the initial toxic bait placement, the additional toxic bait is placed against, adjacent to, contiguous to, abutting or adjoining what remains of the previously placed toxic bait. At no time is any previously placed bait or an interceptor moved or removed. Bait is repeatedly replenished in the station without disturbing previously placed bait until such time as all consumption of bait ceases. As long as termites are feeding on the bait, it is imperative that bait always be present in the station in order to ensure that feeding by the colony on toxic bait is uninterrupted.

If termites do transition to consuming the bait before the interceptors are completely consumed, thereby leaving the interceptors partially consumed, an added benefit may be derived from the station configuration under certain circumstances. If for some reason, the bait is completely consumed before it is replenished and the colony is not yet eradicated, termites, may, instead of abandoning the baiting site, transition back to eating what remains of the nearby interceptors. When the bait is replenished, the termites quickly transition back to eating the lower density bait. The advantage of such a phenomenon, exclusive to the present invention, is that the termite colony remains feeding at the point of aggregation even during lapses in the supply of bait, thereby eliminating the need to reintercept the termite colony to complete its eradication.

The station is inspected at regular intervals (every 15 to 60 days) to assess the extent of termite consumption of the bait. When the bait in the station has been substantially consumed, more bait can be added by removing the cover and inserting more bait. During the addition of bait adjacent to, contiguous to, abutting or adjoining previously placed bait, what remains of the previously placed bait is not moved, removed or disturbed. When termites have ceased to inhabit the station (the result of the eradication or suppression of the termite colony) the station is removed. Optionally, the station can be replaced with a new station with new interceptors in order to intercept any new termite colonies foraging in the area formerly occupied by the suppressed or eradicated colony.

Figure 4:
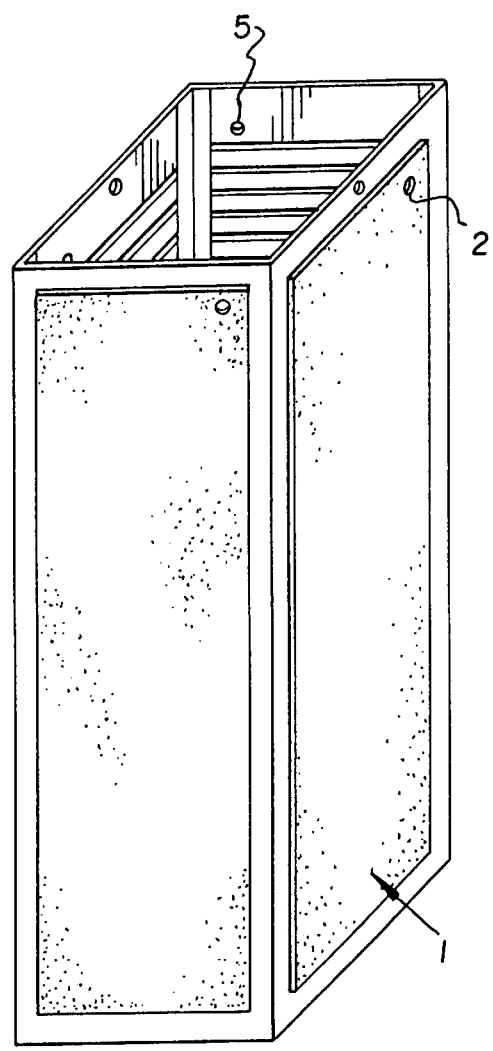
FIG. 4 is a perspective view illustrating interceptors attached to the exterior of the station according to the first alternative embodiment of the invention.
Figure 8:
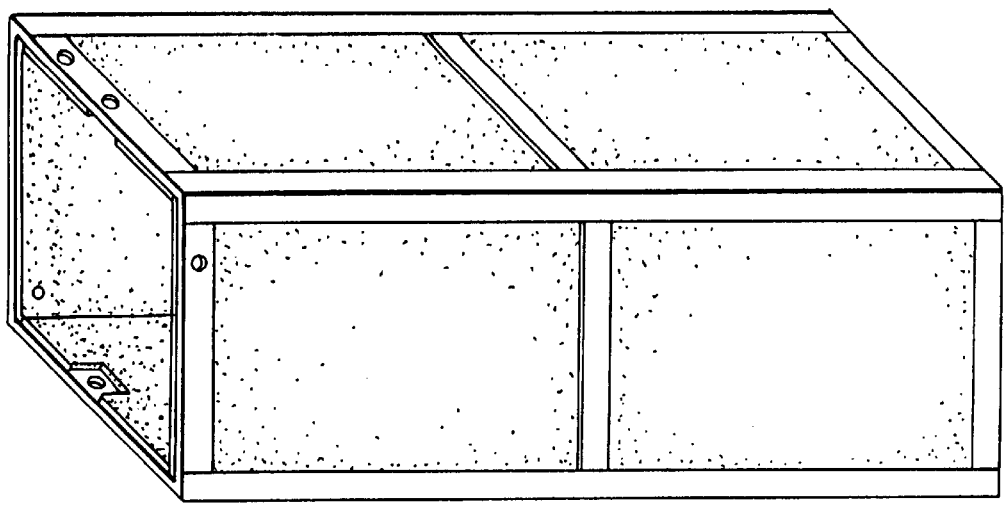
FIG. 8 is a perspective view illustrating a station with large termite entry openings and interceptors affixed to the interior of the station according to the main embodiment of the invention.
Figure 7:
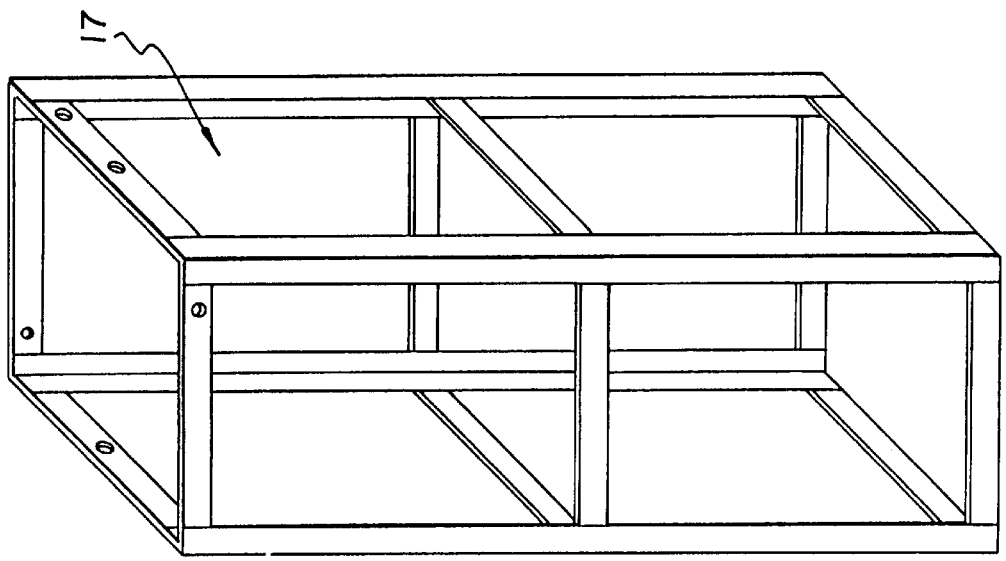
FIG. 7 is a perspective view illustrating a station with large termite entry openings for use with the main embodiment and the first, fourth, fifth and sixth alternative embodiments of the invention.

The first alternative embodiment of the present invention is characterized by the placement of the interceptors on the exterior of the station and the interception of termites outside of the station. The station used with the main embodiment is also used with this embodiment. All numerals refer to FIG. 2 except as indicated. One or more interceptors FIG. 1-1 made of a cellulose containing material palatable to termites are provided. Preferably, a plurality of interceptors are affixed to the exterior of the station, such that each exterior wall and thereby the entire exterior surface of the station, excluding the bottom and access opening, is covered by interceptors FIG. 4. The interceptor(s) is/are fixedly attached to the station in order to insure that it will not be moved or removed at any point in the interception and baiting process in any suitable manner and affixation as well as material selection and details of fabrication to meet the criteria identified herein are well within the level of skill in the art. Attachment of the interceptors is accomplished in the same fashion as with the main embodiment. Interceptors are affixed to the exterior wall of the station such that when the station is deployed in the ground, earth abuts and is contiguous to the entire outer surface of all the interceptors. According to such an arrangement interceptors intervene between the earth and all of the exterior surface of the station except the bottom. The termite entry openings in the station are preferably large and numerous enough that a considerable portion of the surface of the interceptor(s) attached to the exterior of the station is visible when viewed through the termite entry openings from the interior of the station. A sufficient percentage of the interceptor surface visible from the station interior through the termite entry holes is 20% of the surface of the interceptor that rests against the outside of the station. The mass of the interceptors is minimized in the same fashion and for the same reason as in the main embodiment. The interceptor(s) is/are fixedly attached to the exterior of the station in such a way that each interceptor is against, adjacent to, contiguous to, abuts or adjoins the exterior of the station and is also against, adjacent to, abuts or covers at least a portion of one termite access opening in the station walls.

Optionally, nontarget organisms can be excluded from this embodiment of the invention in the same fashion as they are excluded from the main embodiment, the only difference being that the barrier material between the station and the interceptor rest on the exterior of the station at 8,10 instead of on the interior of the station.

The Station is deployed, inspected and baited according to the method of the main embodiment. The station is baited when evidence of termite attack on the interceptors is discovered. Such evidence can be detected upon visual examination of the portion of the interceptor(s) visible through the termite entry openings for damage or mud tubing. Bait is placed in the heretofore vacant station interior after termites are found to be attacking the interceptor(s), however at no time is the interceptor(s) moved or removed. The bait, optionally within a bait container, is placed against, adjoining, adjacent to, contiguous to or abutting an interior wall of the station and is also against, adjoining, adjacent to and covering at least one termite access opening in the station wall. Because the interceptor(s) under termite attack on the exterior of the station and the bait on the interior of the station are both simultaneously against, adjoin, adjacent to or cover at least a portion of one termite entry opening in a wall, termites foraging on and consuming the interceptor inevitably discover the nearby bait directly on the other side of the termite entry openings that the interceptor they are consuming adjoins. Termites transition to consuming the bait in this embodiment for the same reasons as explained with the main embodiment. If the placement of additional bait at a later date becomes necessary due to the depletion of the initial toxic bait placement, the additional bait is placed against, adjoining, adjacent to, contiguous to or abutting what remains of any previously placed bait, however at no time is the previously placed bait or an interceptor moved or removed.

Figure 5:
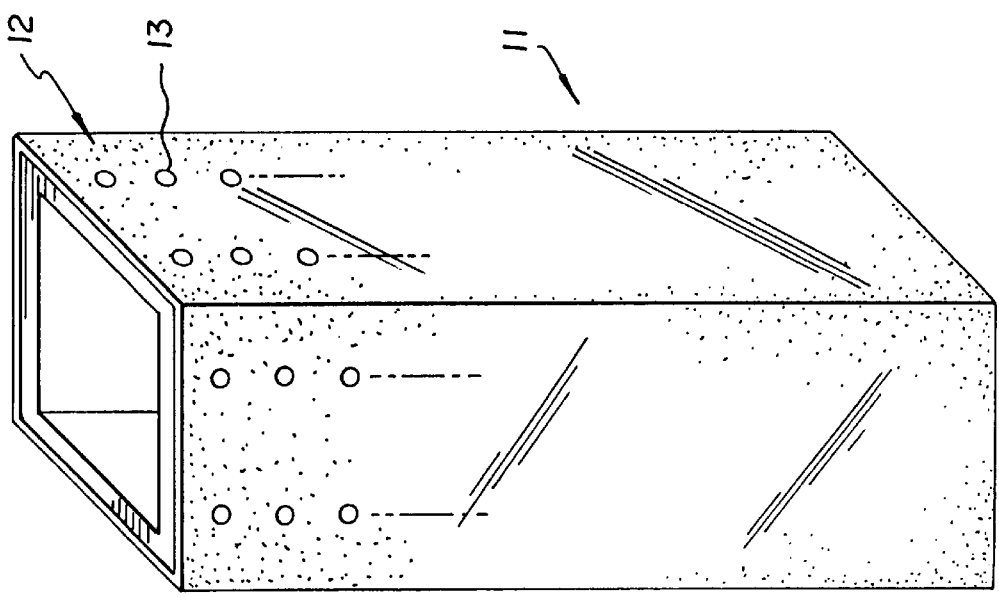
FIG. 5 is a perspective view illustrating a second alternative embodiment involving a protective transparent covering over a cellulose-based station body.
Figure 6:
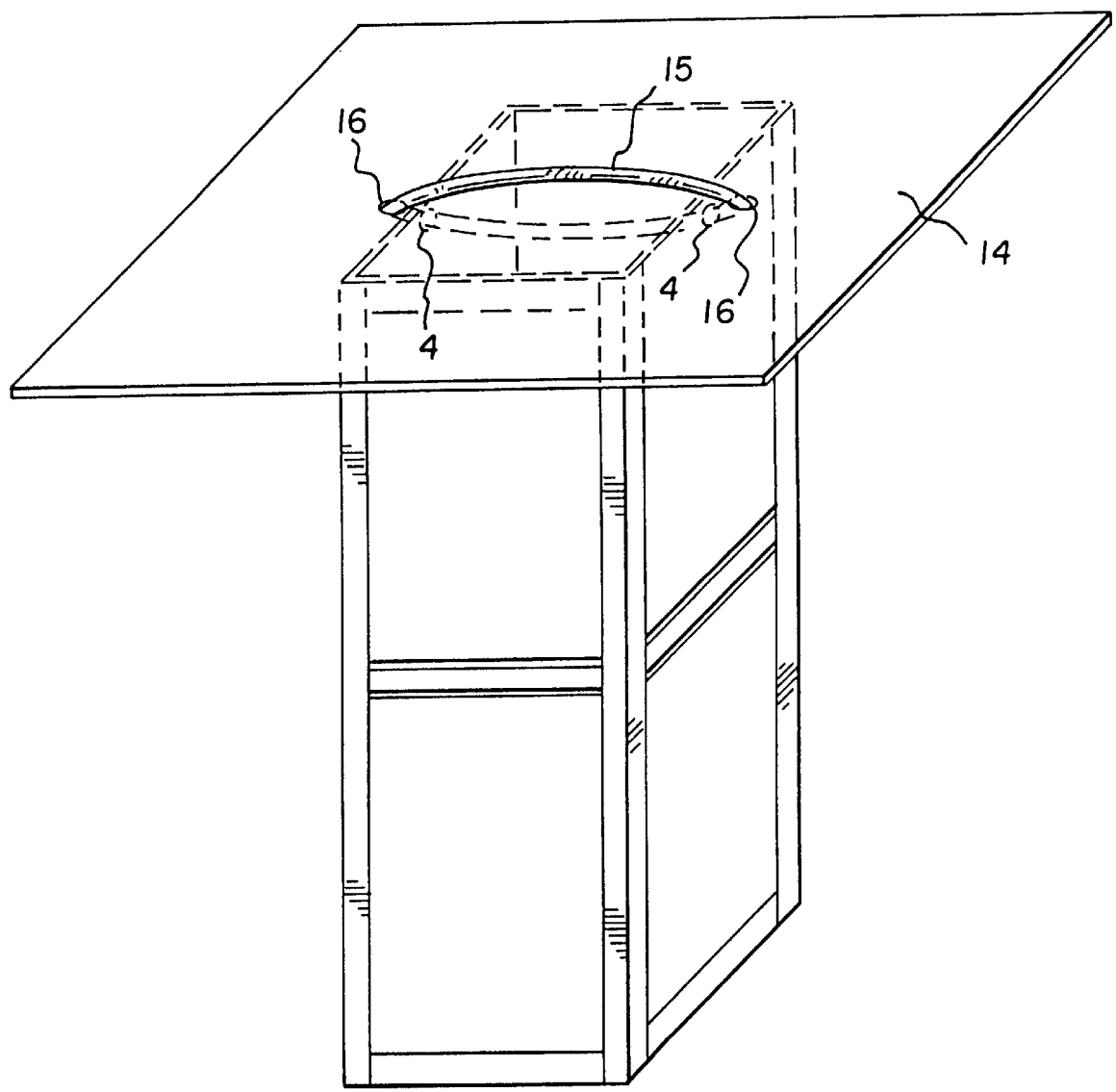
FIG. 6 is a perspective view illustrating a cover affixed to a station.
Figure 9:
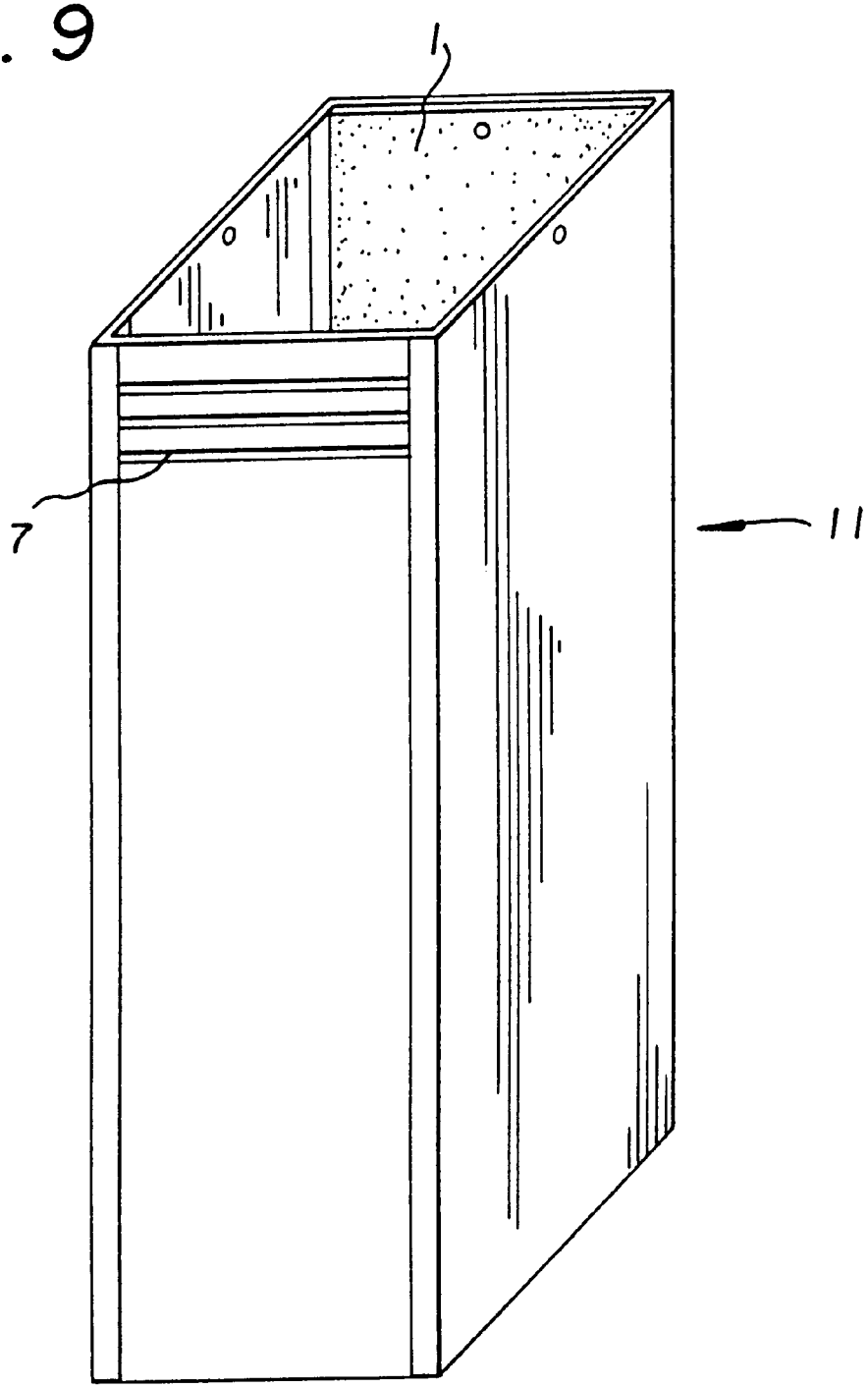
FIG. 9 is a perspective view illustrating the fourth alternative embodiment of the present invention, wherein the interceptor is attached to the interior of the station and does not cover any termite access openings in the housing.
Figure 11:
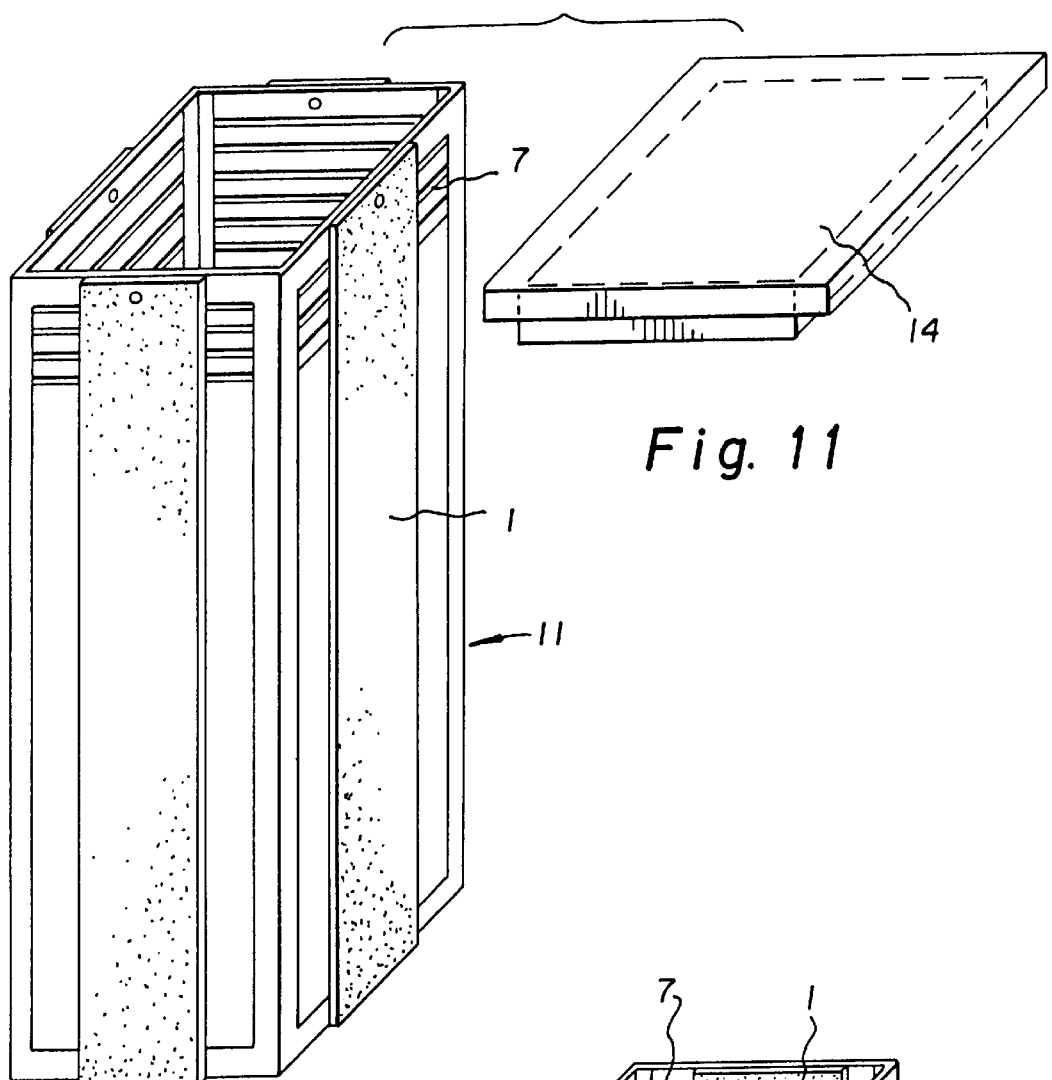
FIG. 11 is a perspective view illustrating the sixth alternative embodiment of the invention, wherein the interceptors are affixed to the exterior of the housing walls and overlie either a part of one or more termite access openings access openings or do not overlie every termite entry opening in the housing.
Figure 10:
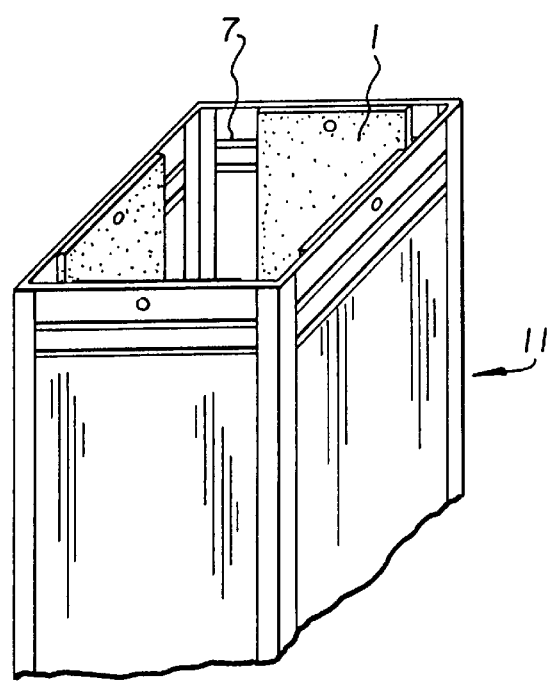
FIG. 10 is a partial perspective view illustrating the fifth alternative embodiment of the invention, wherein the interceptors are affixed to the interior of the housing walls and overlie either a part of one or more termite access openings or do not overlie every termite entry opening in the housing.

A second alternative embodiment of the present invention is characterized by the use of the station body itself as the aggregating medium and the interception of termites with the station body itself. All numerals refer to FIG. 5 except as indicated. The system consists of a housing, referred to as the station body 11, that is composed of a cellulose containing substance palatable to termites, such as cardboard. The Station is deployed, inspected and baited according to the method of the main embodiment, however, no interceptors are used (termites are intercepted by their attack on the station body itself.) A thin protective covering 12 with termite entry openings allowing access to all four sides formed in it 13, for example plastic sheeting (transparent and adhered to the station body with adhesive) is fitted over the entire exterior of the station body, except for the baiting and access opening at the top. The covering impedes the movement of bait out of the station if the station body is substantially damaged or consumed by termite attack during interception. Such an arrangement (protective covering with entry holes outside and interception medium inside) is derivative of the main embodiment.

Termites gain access to the station body itself through the holes 13 in the protective covering. The cellulose based station body does not contain preformed termite entry holes. The termites enter the interior of the bait station by passing through holes 13 and then consuming the portion of the interceptor behind the opening in the protective covering. Because any openings in the station body are formed by termites, the likelihood of invasion by nontarget organisms is diminished. The station body is constructed of a cellulose containing substance thick enough to impart sufficient rigidity to the walls to withstand warping under the lateral pressure that will be imposed if the station body is buried in the earth, however, the mass of the station body is minimized for the reasons explained with the main embodiment.

The station is baited when evidence of attack on the station body is detected. Termites attacking the station invariably leave evidence of such attack, either visible damage to or mud tubing constructed over and across the interior surface of the station body. Bait, optionally within a bait container, is placed in the heretofore vacant station interior after termites are found to be attacking the station body, however at no time is any part of the station body moved or removed. The bait is placed against, adjoining, adjacent to, contiguous to or abutting an interior wall of the station body. Termites foraging on the station body inevitably discover the nearby bait for the same reasons as disclosed with the main embodiment. If the placement of additional toxic bait at a later date becomes necessary due to the depletion of the initial toxic bait placement, the additional toxic bait is placed against, adjacent to, contiguous to, abutting or adjoining what remains of the previously placed toxic bait however at no time is any previously placed bait moved or removed. Bait is repeatedly replenished in the station in the same fashion as in the main embodiment.

A third alternative embodiment of the present invention is also characterized by the use of the station body itself as the aggregating medium, however the protective covering, containing termite entry holes, is affixed to the interior of the station (not shown). The protective covering is transparent in order that termite attack on the station body can be visually detected when the interior of the station body is viewed through the protective covering. This arrangement of aggregating medium on the outside, protective covering on the inside, is derivative of the first alternative embodiment. According to this third arrangement, termites are intercepted by the station body outside of the covering and termites feed on bait placed on the inside of the protective covering after gaining access to the bait through the holes in the protective covering.

The Station is deployed, inspected and baited according to the method of the main embodiment, however, no interceptors are used (termites are intercepted by their attack on the station body itself). The station is baited when evidence of attack on the station body is detected. Termites attacking the station invariably leave evidence of such attack, either visible damage to or mud tubing constructed over and across the surface of the station body visible through the covering.

A fourth alternative embodiment of the invention is characterized by the partial placement of the interceptors on the interior of the station. All numerals refer to FIG. 9 except as indicated. In this embodiment of the invention, the openings 7 are formed only partially in the station walls, either by forming openings in one or more walls, but not all the walls, by forming openings only in part of all of the walls or by forming openings only in parts of one or more walls but not all the walls. One or more interceptors 1 are fixedly attached to the interior of the station in such a way that an interceptor is against, adjacent to, contiguous to, abuts or adjoins the interior of the station, but is not against and does not cover any part of any termite access opening in the station wall(s). Foraging termites enter the station through the termite entry holes 7 and traverse to the interceptor 1 by building enclosed exploratory protective tubing across the interior surface of the station wall(s) that contain no entry holes between the point they entered the station and the interceptor. Such an arrangement can potentially allow for the more expedient detection of termites foraging at the station because the exploratory tunnels that traverse across the station walls can, in certain situations, be found earlier than evidence of termite activity in a station of the main embodiment. This is because in the embodiment, only evidence of termite foraging in the form of exploratory tubes on the station wall(s) must be found whereas in the main embodiment, termite damage to the interceptor, which takes more time, must normally occur for termites to be detected. Provisions are not made to exclude non-target organisms from the station interior, therefore, this embodiment of the station is not useful in areas where non-target organisms are a problem.

The station is deployed, inspected and baited according to the method of the main embodiment. The station is baited when evidence of foraging termites is discovered on the station walls or termite attack against the interceptor is discovered.

A fifth alternative embodiment of the present invention is characterized by the partial placement of the interceptors on the interior of the station. The station used with the main embodiment is also used with this embodiment. All numerals refer to FIG. 10 except as indicated. The difference between this embodiment and the main embodiment is that the interceptors 1 overlie either only one part of one or more termite entry openings 7 or do not overlie every termite entry opening. The interceptor(s) is/are fixedly attached to the interior of the station in such a way that an interceptor is against, adjacent to, contiguous to, abuts or adjoins the interior of the station, but is not against and does not overlie every termite access opening in the station walls or does not overlie every termite entry opening in its entirety. The top (not shown) in this embodiment can be interfitted tightly over and against the exterior walls with or without additional means of attachment.

This embodiment is most useful in areas of high ground moisture. Leaving all or part of one or more termite entry openings uncovered by interceptors allows for quick drainage of water out of the station. Sizing of the interceptors such that they do not cover the entire wall allows for the swelling of the interceptors as they absorb moisture. In areas of high moisture content, such undersizing may be necessary in order that interceptors are not swollen with water to a size larger than the station wall that they are against and thereby buckling away from the station wall. Provisions are not made to exclude non-target organisms from the station interior, therefore, this embodiment of the station is not useful in areas where non-target organisms are a problem.

The station is deployed, inspected and baited according to the method of the main embodiment. The station is baited when termite attack against the interceptor is discovered.

A sixth alternative embodiment of the present invention is characterized by the partial placement of the interceptors on the exterior of the station. The station used with the main embodiment is also used with this embodiment. All numerals refer to FIG. 11 except as indicated. In this embodiment of the invention, the interceptors 1 overlie either only part of one or more termite entry openings 7 or do not overlie every termite entry opening. The interceptor(s) is fixedly attached to the exterior of the station in such a way that an interceptor is against, adjacent to, contiguous to, abuts or adjoins the exterior of the station but is not against and does overlie every termite access opening in the station walls or does not overlie every termite entry opening in its entirety. In this embodiment, the top (not shown) can be interfitted tightly against the interior walls with or without additional means of attachment.

This embodiment is most useful in areas of high ground moisture. Leaving all or part of one or more termite entry openings uncovered by interceptors allows for quick drainage or water out of the station. Provisions are not made to exclude non-target organisms from the station interior, therefore this embodiment of the station is not useful in areas where non-target organisms are a problem.

The station is deployed, inspected and baited according to the method of the main embodiment. The station is baited when termite attack against the interceptor is discovered.

As noted above, according to the present invention, the aggregating medium is never moved or removed for inspection. Instead it is visually inspected for termite attack in situ with care taken to not move, remove or disturb the aggregating medium, the termites (if any) infesting the aggregating medium or any termite tunnels leading from the aggregating medium out of the station to the locus of the termite colony.

Also, as noted herein, according to the present invention, instead of removing and replacing the aggregating medium with toxic bait, it is supplemented with toxic bait placed against, adjacent to, contiguous to, butting or adjoining the aggregating medium. Termites are then allowed to transition at will from consuming the aggregating medium to consuming the toxicant containing bait instead of being forced to involuntarily transfer from one medium to the other.

As further noted herein, according to the present invention, the toxicant containing bait is never moved or removed for inspection. Instead it is visually inspected for termite attack in situ with care taken to not disturb, remove or move the bait, the termites (if any) feeding on the bait or any termite tunnels leading from the bait to the aggregating medium and/or out of the station to the locus of the termite colony.

Additionally, according to the present invention, previously placed bait is supplemented as needed with additional bait being placed against, adjacent to, contiguous to, abutting or adjoining the previously placed bait, however at no time is the previously placed bait moved or removed.

In short, in accordance with the present invention, the aggregating medium or bait is not disturbed at any point in the interception and baiting cycle.

Additionally, if for some reason, bait is completely consumed before it is replenished and some portion of the interceptors is still intact, the termites can transition back to eating what remains of the nearby interceptors until the bait is replenished. The advantage of such an arrangement, exclusive to the present invention, is that the termite colony remains feeding at the point of aggregation even during lapses in the supply of bait, thereby eliminating the time-consuming process of reintercepting the termite colony either at the station or another location in order to complete its eradication.

Although the description above contains many specificities, these should not be construed as limiting the scope of the invention but as merely providing illustrations of some of the presently preferred embodiments of this invention. Thus the scope of the invention should be determined by the appended claims and their legal equivalents, rather than by the examples given.

I claim:

1. In an apparatus for monitoring, detecting and controlling termite infestation, said apparatus comprising a housing composed of a termite resistant material, comprised of (1) a bottom, (2) sidewalls having an interior and exterior surface and (3) a top, said top, bottom and the interior surface of said sidewalls delimiting a housing interior volume, said top including means for accessing the housing interior volume to identify the presence of termites and to introduce toxic bait into the interior volume upon identification of the presence of termites; the improvement comprising a plurality of compartments in said interior volume of the housing formed by one or more interior walls, each said compartment being accessible by termites present in an adjacent compartment through an opening in the one or more interior walls which said adjacent compartments have in common.

2. A method of monitoring, detecting and controlling termite infestation which comprises:

a) positioning an apparatus for monitoring and detecting termite infestation in an area to be monitored for termite presence, said apparatus comprising a housing composed of a termite resistant material, comprised of (1) a bottom, (2) sidewalls and (3) a top including means for accessing the housing interior volume to identify the presence of termites and to introduce toxic bait into the interior volume upon identification of the presence of termites; said top, bottom and sidewalls delimiting a housing interior volume compartmentalized by means of internal walls, each compartment being accessible by termites present in an adjacent compartment through an opening in the internal walls that such adjacent compartments have in common; said housing having in at least one sidewall at least one opening large enough to permit termites to pass through said sidewall opening;

b) inspecting the interior volume of said apparatus until termite activity is identified; then c) introducing toxic bait into a first compartment; and then d) identifying when said toxic bait in said first compartment has been consumed and replenishment of toxic bait is required; and then, e) replenishing the bait by introducing toxic bait in a second compartment adjacent to said first compartment.

3. The method of claim 2, wherein no interceptor overlies any portion of any sidewall opening in the housing.

4. The method of claim 2, wherein at least one sidewall of the housing to which an interceptor is fixedly attached has at least one opening therein, and an interceptor comprised of a nontoxic termite bait is fixedly attached to the exterior surface of said sidewall, said interceptor overlying at least a portion of said sidewall opening.

5. The method of claim 3, wherein at least one sidewall of the housing to which an interceptor is fixedly attached has at least one opening therein, and an interceptor comprised of a nontoxic termite bait is fixedly attached to the interior surface of said sidewall, said interceptor overlying at least a portion of said sidewall opening.

6. The method of claim 2, wherein an interceptor comprised of nontoxic termite bait is fixedly attached to the interior of every sidewall having an opening therein and overlies each opening in its entirety.

7. The method of claim 3, wherein an interceptor comprised of nontoxic termite bait is fixedly attached to the interior of every sidewall having an opening therein and overlies each opening in its entirety.

8. The method of claim 2, wherein the toxic bait inserted into said interior volume is contained in a mesh bait bag, the mesh size of said bait bag being such that entry of termites into the bait bag is unimpeded.

9. The method of claim 8, wherein the mesh bait bag containing loose fill toxic bait substantially fills the interior volume of the housing not occupied by interceptors.

10. The method of claim 8, wherein the toxic bait is preferentially consumed by termites over the interceptors.

* * * * *